United States Patent
Neubacher et al.

(10) Patent No.: US 10,652,940 B2
(45) Date of Patent: May 12, 2020

(54) COMMUNICATION BETWEEN NETWORK NODES OF A MOBILE COMMUNICATION NETWORK

(71) Applicant: Deutsche Telekom AG, Bonn (DE)

(72) Inventors: Andreas Neubacher, Korneuburg (AT); Olaf Zingler, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/555,078

(22) PCT Filed: Mar. 4, 2016

(86) PCT No.: PCT/EP2016/054654
§ 371 (c)(1),
(2) Date: Sep. 1, 2017

(87) PCT Pub. No.: WO2016/139344
PCT Pub. Date: Sep. 9, 2016

(65) Prior Publication Data
US 2018/0042060 A1    Feb. 8, 2018

(30) Foreign Application Priority Data
Mar. 4, 2015   (EP) ..................... 15157644

(51) Int. Cl.
*H04W 72/04*    (2009.01)
*H04W 76/14*    (2018.01)
(Continued)

(52) U.S. Cl.
CPC ........... *H04W 76/14* (2018.02); *H04W 24/02* (2013.01); *H04W 72/0426* (2013.01); *H04W 92/20* (2013.01); *H04W 76/12* (2018.02)

(58) Field of Classification Search
CPC . H04W 76/14; H04W 76/12; H04W 72/0426; H04W 92/20; H04W 24/02
See application file for complete search history.

(56) References Cited

U.S. PATENT DOCUMENTS

| | | | |
|---|---|---|---|
| 2010/0227603 A1* | 9/2010 | Gupta | H04W 24/02 455/418 |
| 2010/0248723 A1* | 9/2010 | Yasuoka | H04W 92/20 455/436 |

(Continued)

OTHER PUBLICATIONS

Alcatel-Lucent: "Completion of Release 8 SON and RRM features", 3GPP DRAFT; R-090732 SONCOMPL, Seoul, Korea; Mar. 18, 2009, Mar. 18, 2009 (Mar. 18, 2009) (Year: 2009).*

(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

A method for communication between network nodes of a mobile communication network includes: transmitting, by a first base station, a first message to a specific network node using a first indirect communication interface; and transmitting, by the specific network node, a second message to a second base station entity using the second indirect communication interface. Via the first and second messages, information related to configuration information content is transparently transmitted from the first base station entity to the second base station entity, via the specific network node of the mobile communication network, using the first and second indirect communication interfaces.

13 Claims, 1 Drawing Sheet

(51) Int. Cl.
*H04W 24/02* (2009.01)
*H04W 92/20* (2009.01)
*H04W 76/12* (2018.01)

(56) References Cited

U.S. PATENT DOCUMENTS

| | | | |
|---|---|---|---|
| 2012/0100860 A1 | 4/2012 | Lei et al. | |
| 2012/0190368 A1* | 7/2012 | Zhang | H04W 36/0055 455/436 |
| 2014/0179325 A1* | 6/2014 | Xu | H04W 36/0055 455/437 |
| 2015/0023320 A1* | 1/2015 | Inakoshi | H04W 76/12 370/331 |
| 2016/0073301 A1* | 3/2016 | Yanagisako | H04W 36/0055 455/436 |
| 2017/0026879 A1* | 1/2017 | Fukuda | H04W 16/32 |
| 2017/0195925 A1* | 7/2017 | Nishikawa | H04W 24/02 |

OTHER PUBLICATIONS

Alcatel-Lucent: "Completion of SON and RRM features", 3GPP DRAFT; R-090733 S1SONCOMPLCR, Seoul, Korea; Mar. 18, 2009, Mar. 18, 2009 (Mar. 18, 2009) (Year: 2009).*

Alcatel-Lucent: "Completion of Release 8 SON and RRM features", 3GPP DRAFT; R-090732 SONCOMPL, $3^{rd}$ Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009 (Mar. 18, 2009), XP050341119, the whole document.

Alcatel-Lucent: "Completion of SON and RRM features", 3GPP DRAFT; R-090733 S1SONCOMPLCR, $3^{rd}$ Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009 (Mar. 18, 2009), XP050341120, the whole document.

"LTE; Evolved Universal Terrestrial Radio Access Network (E-UTRAN); S1 Application Protocol (S2AP) (3GPP TS 36.413 version 12.3.0 Release 12)", Technical Specification, European Telecommunications Standards Institute (ETSI), 650, Route Des Lucioles; F-06921 Sophia-Antipolis Cedex; France, vol. 3GPP RAN 3, No. V12.3.0, Sep. 1, 2014 (Sep. 1, 2014), XP014224257.

Philippe Godin et al: "Self-Optimizing Networks" In: "LTE—The UMTS Long Term Evolution From Theory to Practice", Jul. 22, 2011 (Jul. 22, 2011), John Wiley & Sons, Chichester, Great Britain, XP055085716, pp. 581-598.

"$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)", 3GPP DRAFT; 23401-C70, $3^{rd}$ Generation Partnership Project (3GPP), Mobile Competence Centre; 650, Route Des Lucioles; F-06921 Sophia-Antipolis Cedex, France, Dec. 5, 2014 (Dec. 5, 2014), XP050906734.

* cited by examiner

COMMUNICATION BETWEEN NETWORK NODES OF A MOBILE COMMUNICATION NETWORK

CROSS-REFERENCE TO RELATED APPLICATIONS

This application is a U.S. National Phase application under 35 U.S.C. § 371 of International Application No. PCT/EP2016/054654, filed on Mar. 4, 2016, and claims benefit to European Patent Application No. EP 15157644.4, filed on Mar. 4, 2015. The International Application was published in English on Sep. 9, 2016 as WO 2016/139344 A1 under PCT Article 21(2).

FIELD

The present invention relates a method for improved communication between network nodes of a mobile communication network comprising at least a first base station entity and a second base station entity, wherein the first and second base station entities are enabled—using a first indirect communication interface between the first base station entity and a specific network node of the mobile communication network and using a second indirect communication interface between the second base station entity and the specific network node of the mobile communication network—to transmit an information related to a configuration information content from the first base station entity to the second base station entity but wherein the first and second base station entities are lacking a direct communication interface to directly transmit the configuration information from the first base station entity to the second base station entity.

Furthermore, the present invention relates to a mobile communication network for improved communication between network nodes of the mobile communication network, the mobile communication network comprising at least a first base station entity and a second base station entity, wherein the first and second base station entities are enabled—using a first indirect communication interface between the first base station entity and a specific network node of the mobile communication network and using a second indirect communication interface between the second base station entity and the specific network node of the mobile communication network—to transmit an information related to a configuration information content from the first base station entity to the second base station entity but wherein the first and second base station entities are lacking a direct communication interface to directly transmit the configuration information from the first base station entity to the second base station entity.

Additionally, the present invention relates to a program and a computer program product.

BACKGROUND

The exchange of packetized information in wireless communication systems (or mobile communication networks) has already grown dramatically and probably will also grow in the future due to the rapid adoption of data services in mobile communication networks. Compared to voice services, data services require significantly more traffic and, hence, a much lower cost per bit is needed. A considerable effort has therefore been put in the development of standards for the LTE RAN (Long Term Evolution Radio Access Network) and EPC (Evolved Packet Core), which address these evolving needs.

Seamless mobility in cellular networks or mobile communication networks, like, e.g., LTE networks, is enabled by continued (radio) coverage (of user equipments) and respective communication within the mobile communication network, such as signaling among base transceiver stations (e.g. eNodeBs in LTE) and/or the hierarchically higher network nodes, such as, e.g., MMEs (Mobility Management Entities) and SGWs (Serving GateWays in LTE).

Most signaling messages in the context of ensuring the mobility functionality towards user equipments need to be exchanged between the source and the target base-transceiver stations (or source and target base station entities)—in case of such entities in the context of an LTE mobile communication network these are called eNBs (eNodeBs, or enhanced NodeBs).

In order to allow mobility-related signaling to be processed as much as possible locally (i.e. between base station entities) and to prevent hierarchically higher network nodes like MMEs and SGWs from bearing mobility-related signaling related to the whole customer base of the network operator, the concept of direct interfaces, like the X2 communication interface, has been introduced in LTE, i.e. a direct communication interface between a first and second base station entity to directly transmit information such as configuration information from the first base station entity to the second base station entity. The X2 communication interface is a type of communication interface between base station entities of a mobile communication network, especially a mobile communication network according to or using the Long Term Evolution (LTE) radio access technology. Typically, the X2 communication interface connects neighboring base station entities, typically enhanced NodeBs (or eNodeBs) in a peer to peer fashion to assist handover and provide for rapid co-ordination of radio resources.

In case of a handover event between two given base station entities that do not have an established X2 communication interface between them, the relevant handover-related information exchange can be transmitted using an S1 communication interface—which is a communication interface between, on the one hand, the eNodeBs (or base station entities) of the access network of the mobile communication network, and, on the other hand, specific network nodes of the mobile communication network, especially of the core network, such as MME nodes and/or SGW nodes—in order to perform the handover of the user equipment between the two involved base station entities, despite the fact that using the S1 communication interface for handovers causes a higher signaling load towards hierarchically higher (compared to the base station entities of the access network) network nodes like MMEs and SGWs.

Beside switching or exchanging user plane data between base station entities—e.g. the user plane data path from the source to the target base-transceiver station, especially in case of an actual or potential handover event of a user equipment between the base station entities—the X2 communication interface allows the exchange of mobility related signaling without the need to involve hierarchical higher network nodes, like MMEs and SGWs.

Via the X2 communication interface, all user equipment-associated signaling in the context of providing mobility-related services is bypassing the hierarchical higher network nodes (typically of the core network of the mobile communication network), like MMEs and SGWs. Thus, in case of frequent hand over events between two given base station entities, i.e. frequent mobility load between two eNodeBs, it is beneficial to set up an X2 communication interface between such base station entities, thus especially adjacent eNodeBs or base station entities having an overlapping or at least partly overlapping radio coverage area.

In order to provide a smooth mobility functionality, other configurations data—that are not triggered by a handover event, such as updating a changed physical cell identifier information or the like—can be exchanged, directly between two base station entities, using the X2 communication interface, i.e. via the X2 communication interface, such that configurations data or update information can be propagated within the access network of the mobile communication network in an autonomous manner through the involved base station entities and without the involvement of hierarchically higher network nodes (for triggering the propagation of such configuration information through the access network).

However, the number of X2 communication interfaces (or instances of the X2 communication interface) at a given base station entity is typically comparatively low when compared to the number of potentially neighboring base station entities having an at least partly overlapping radio coverage area—this being true especially in case that, as it is expected, a growing number base station entities providing or serving relatively small radio coverage areas (small radio cells) will be installed, especially in telecommunications networks having a layered structure (i.e. having (in a first layer) a number of radio cells aiming at providing radio coverage for a complete given geographical area, and additionally having (in a second layer) further radio cells at specific locations providing additional radio capacity and/or coverage on top of the radio coverage provided from the first layer for these specific locations).

As a result, there are and there will be a growing number of situations of neighboring base station entities that cannot be linked with each other by an X2 communication interface, and, hence, in order for configurations data or update information to be reliably propagated among a plurality of (neighboring) base station entities of the access network, there would be a direct involvement of hierarchically higher network nodes, i.e. each base station entity would individually receive an update information, e.g. via the S1 communication interface, that would be generated by the respective hierarchically higher specific network node.

SUMMARY

In an exemplary embodiment, the present invention provides a method for communication between network nodes of a mobile communication network. The mobile communication network comprises an access network and a core network, wherein the access network comprises a plurality of base station entities, the plurality of base station entities comprising a first base station entity and a second base station entity, wherein the first and second base station entities are configured—using a first indirect communication interface between the first base station entity and a specific network node of the mobile communication network and using a second indirect communication interface between the second base station entity and the specific network node of the mobile communication network—to transmit information related to configuration information content from the first base station entity to the second base station entity. The first and second base station entities lack a direct communication interface to directly transmit the information related to the configuration information content from the first base station entity to the second base station entity. The method includes: transmitting, by the first base station, a first message to the specific network node using the first indirect communication interface; and transmitting, by the specific network node, a second message to the second base station entity using the second indirect communication interface. Via the first and second messages, the information related to the configuration information content is transparently transmitted from the first base station entity to the second base station entity, via the specific network node of the mobile communication network, using the first and second indirect communication interfaces.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
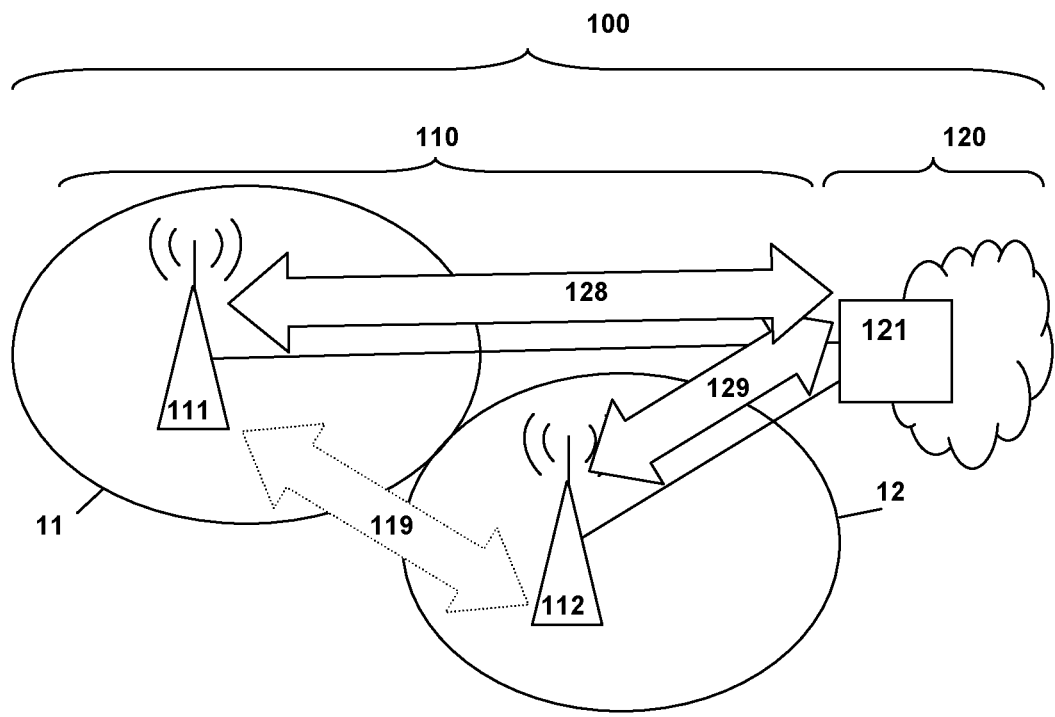
FIG. 1 schematically illustrates a mobile communication network with a first base station entity, a second base station entity, a core network, and an access network, wherein a potential direct communication interface as well as indirect communication interfaces are shown.

Exemplary embodiments of the present invention provide a technically simple, effective and cost effective, decentralized solution for an improved communication between the network nodes of a mobile communication network, especially between neighboring or adjacent base station entities (typically having a neighboring and/or a partly overlapping radio coverage area of the respective radio cells) of an access network of a mobile communication network. Exemplary embodiments of the present invention further provide a corresponding mobile communication network to fulfil self-configuration/self-healing tasks between radio base stations without the classical usage of a hierarchically higher operation and maintenance entity.

In an exemplary embodiment, the present invention provides a method for improved communication between network nodes of a mobile communication network, wherein the mobile communication network comprises an access network and a core network, wherein the access network comprises a plurality of base station entities, the plurality of base station entities comprising at least a first base station entity and a second base station entity, wherein the first and second base station entities are enabled—using a first indirect communication interface between the first base station entity and a specific network node of the mobile communication network and using a second indirect communication interface between the second base station entity and the specific network node of the mobile communication network—to transmit an information related to a configuration information content from the first base station entity to the second base station entity but wherein the first and second base station entities are lacking a direct communication interface to directly transmit the configuration information from the first base station entity to the second base station entity, wherein the method comprises the following steps:

in a first step, a first message is transmitted, by the first base station entity and using the first indirect communication interface, to the specific network node, in a second step, subsequent to the first step, a second message is transmitted, by the specific network node and using the second indirect communication interface, to the second base station entity, wherein via the first and second messages, the information related to the configuration information content is transparently transmitted from the first base station entity to the second base station entity, via the specific network node of the mobile communication network, using the first and second indirect communication interface.

In an exemplary embodiment, the present invention provides a method for improved communication between network nodes of a mobile communication network, wherein the mobile communication network comprises an access network and a core network, wherein the access network comprises a plurality of base station entities, the plurality of base station entities comprising at least a first base station entity and a second base station entity, wherein the first and second base station entities are enabled—using a first indirect communication interface between the first base station entity and a specific network node of the mobile communication network and using a second indirect communication interface between the second base station entity and the specific network node of the mobile communication network—to transmit an information related to a configuration information content from the first base station entity to the second base station entity, wherein a direct communication interface is able to be established between the first and second base station entities in order for the first and second base station entities to be able to communicated directly with each other but wherein the first and second base station entities are lacking the direct communication interface to directly transmit the configuration information from the first base station entity to the second base station entity, wherein the method comprises the following steps:

in a first step, a first message is transmitted, by the first base station entity and using the first indirect communication interface, to the specific network node, in a second step, subsequent to the first step, a second message is transmitted, by the specific network node and using the second indirect communication interface, to the second base station entity, wherein via the first and second messages, the information related to the configuration information content is transparently transmitted from the first base station entity to the second base station entity, via the specific network node of the mobile communication network, using the first and second indirect communication interface.

It is thereby advantageously possible according to the present invention that other configurations data—that are not triggered by a handover event, such as updating a changed physical cell identifier information or the like—can be exchanged between two base station entities, especially using the S1 communication interface, in an autonomous manner through the involved base station entities and where the involvement of hierarchically higher network nodes is largely reduced—effectively to only transparently transmitting messages to base station entities that have been received by other base station entities.

According to the present invention, the term "indirect communication interface"—used in the wording "first indirect communication interface" between the first base station entity and the specific network node of the mobile communication network and in the wording "second indirect communication interface" between the specific network node of the mobile communication network and the second base station entity—refers to the situation that, via the two indirect communication interfaces involving the specific network node as a kind of relay node, a communication interface is established between the first and second base station entity (and hence a communication, via that path, is possible) such that this communication interface is not a direct communication interface but an indirect communication interface (using the specific network node for transparently relaying messages, being sent by the first base station entity and being directed to the second base station entity). The first and second indirect communication interfaces between the respective base station entities and the specific network node are preferably direct logical communication interfaces, i.e. the connection between the connected network nodes corresponding to the indirect communication interface is a logical connection.

According to the present invention, the phrase "the first and second base station entities are lacking a direct communication interface" refers to the situation that a direct communication interface (such as the X2 communication interface between base station entities) is not present between the first and second base station entity.

According to the present invention, it is advantageously possible to provide—by using the first and second indirect communication interfaces—for propagation of configuration information between base station entities in an autonomous and reliable manner, without the need to require to involve hierarchically higher network nodes like the operation and maintenance entity, for triggering, processing and propagating such configuration information through the access network. Instead, hierarchically higher network nodes like MMEs are just being required to transparently forward messages towards the second base station entity that were previously received by the first base station entity.

In case of comparatively infrequent handover events between two given base station entities, i.e. in case of reduced mobility between these base station entities, there are benefits in using the indirect communication interfaces (especially the S1 communication interface) for such infrequently used relations of neighboring base station entities, since, typically, the number of instances of direct communication interfaces (especially X2 communication interface instances) is limited (within base station entities) and hence, the available instances of direct communication interfaces (of a given base station entity) such as the X2 communication interface could be more efficiently used for more beneficial connections to other base station entities (e.g. relations to other base station entities bearing a higher mobility load).

Although using the indirect communication interfaces (i.e. the S1 communication interface) for handovers causes a higher signaling load towards hierarchically higher (compared to the base station entities of the access network) network nodes like MMEs and SGWs, in case of comparatively infrequent handover events between two given base station entities, i.e. in case of reduced mobility between these base station entities, there are benefits in using the indirect communication interfaces for such infrequently used relations, due to the limited number of instances of direct communication interfaces between base station entities.

According to the present invention, it is advantageously possible to solve a typical mobility related problem: E.g. in case of a situation of LTE inter-frequency cell reselection or LTE inter-frequency connected mobility, the user equipment in the source radio cell (currently serving the user equipment as serving base station entity) needs to be provided with the carrier frequency of the target radio cell. Without this information, the user equipment is not able to measure the target cell field-strength and quality being necessary input, for the handover or cell reselection decision. According to the conventionally known functionality, in case of a non-existent direct communication interface (e.g. in form of an X2 communication interface between the respective base station entities) and hence only the availability of an indirect communication interface (e.g. a configured S1 communication interface) for exchanging mobility-related configuration data or updates regarding the configuration, there is no automatic exchange, e.g., information about changes of the carrier frequency of the target cell. Consequently, according to the conventionally known functionality, the user equipment might not be configured to measure the new carrier frequency of the target base station entity and as consequence the handover might not be possible to be performed and the call might fail. According to the conventionally known functionality of base station entities, in case of an existing direct communication interface (e.g. in the form of an X2 communication interface), both (target and source) eNBs (i.e. the first and second base station entity) can be mutually kept up to date by the "ENB CONFIGURATION UPDATE" procedure over the X2 communication interface, which functionality does not exist in the absence of a direct communication interface, e.g. an X2 communication interface.

Another example of such a case, i.e. where configuration data is not able to be transmitted in an autonomous manner (i.e. without an involvement of hierarchically higher network nodes beyond merely transparently forwarding a message) by the two (typically neighboring and/or adjacent) base station entities relates to changes of cell identifier information, such as, in LTE, the Physical Cell Identifier (PCI) information. The pair of the physical cell identifier information (or generally a cell identifier information) and the carrier frequency (as part of the mobile measurement report) allows a fast and reliable mapping, within the source base station entity, to an unique address of the target base station entity (i.e. of the target radio cell), in the form of, e.g., the IP-address; hence this is an essential part of the mobility procedure support. To have a unique mapping of the pair of the cell identifier and the carrier frequency with a target radio cell (or the respective base station entity), updates of these parameters, especially the cell identifier, have to be performed to react, for example, on changes in the network structure, to the integration of new sites (especially new base station entities) and/or optimized antenna parameters, etc. If a cell identifier is changed in a certain radio cell (i.e. at the respective base station entity), it has to be ensured that this update is also taken into consideration in all surrounding radio cells (i.e. the respective base station entities) where the legacy (or former) cell identifier is stored, in order to maintain consistency and to allow, for each one of the neighboring radio cells, the correct mapping into the cell address of the radio cell that had its cell identifier updated. Therefore also the cell identifier is part of the "ENB CONFIGURATION UPDATE" procedure over X2, but, as has already been stated, can only be used if an X2 communication interface exists between both involved base station entities.

According to the present invention, it is advantageously possible to handle such cases of an autonomous update among base station entities (or their respective radio cells) also in order to enable a consistent handling of databases within the telecommunications network: In case of network equipment of different vendors, changes of parameters or configuration information is initially communicated to the respective base station entity via, e.g., a communication interface from a hierarchically higher network node, such as the S1 communication interface. It is advantageously possible according to the present invention that the propagation of such changes of parameters or configuration information—also to base station entities (typically in the vicinity of the considered base station entity where the modification took place) that are related to another vendor—is performed autonomously. Additionally, exemplary embodiments of the present invention advantageously provide the possibility of autonomous update also towards base station entities that have a comparatively small radio coverage area, the number of such small radio cells being expected to grow. Such small radio cells often record infrequent user equipment mobility events and thus an X2 communication interface is rather not likely to be established towards such small radio cells.

According to the present invention, it is advantageously possible to offload cases of infrequent mobility events to be handled via the indirect communication interface (S1 communication interface) between base station entities. This advantageously enhances and simplifies the maintenance of the direct communication interface (X2 communication interface) and furthermore advantageously provides a possibility to realize the telecommunications network in a more robust manner and as well more adapted to include network equipment such as network nodes of different vendors (multivendor capable), as the exchange of especially configuration and/or update information between adjacent (or overlapping) base station entities (i.e. their respective radio coverage areas or radio cells are adjacent or overlapping) is able to be performed in an autonomous manner. Advantageously, this avoids triggering unnecessary follow up procedures, or even worse, triggering procedures finally ending up in error conditions due to misconfigurations of base station entities.

According to a preferred embodiment of the present invention, the information related to the configuration information content comprises configuration information.

Thereby, it is advantageously possible that the first base station entity corresponds to the base station entity where a change of configuration has taken place and wherein this change of configuration is transmitted to the second base station entity via the two indirect communication interfaces and a transparent forwarding of such configuration information by the specific network node to the second base station entity.

According to a preferred embodiment of the present invention, the information related to the configuration information content comprises a request to provide configuration information.

Thereby, it is advantageously possible that that the first base station entity corresponds to a base station entity that requests an assumed change of configuration from the second base station entity via the two indirect communication interfaces and likewise a transparent forwarding of such request by the specific network node to the second base station entity. This case relates, e.g., to cases where (comparatively infrequent) handover events took place between the second base station entity towards the first base station entity during a preceding period of time, and suddenly such handover events are not taking place any more. In such a situation, it is advantageously possible that the first base station entity requests changes within the configuration of the second base station entity.

According to a further preferred embodiment of the present invention, the method furthermore comprises the following steps:

in a third step, subsequent to the second step, a third message is transmitted, by the second base station entity and using the second indirect communication interface, to the specific network node, in a fourth step, subsequent to the third step, a fourth message is transmitted, by the specific network node and using the first indirect communication interface, to the first base station entity, wherein via the third and fourth messages, the reception, at the second base station entity, of the information related to the configuration information content is acknowledged to the first base station entity or—in case that the information related to the configuration information content of the first and second messages comprises a request to provide configuration information—the configuration information content transmitted to the first base station entity.

Thereby, it is advantageously possible that the transmission of the information related to the configuration information is safely and reliably transmitted to the second base station entity, i.e. the first base station entity is aware that the information related to the configuration information has been transmitted.

Furthermore, according to an embodiment of the present invention, it is preferred that the specific network node is a mobility management entity (MME) within the core network of the mobile communication network.

Thereby, it is advantageously possible to handle such information exchange in an efficient manner and by involving only a comparably small number of hierarchically higher network nodes of the telecommunications network.

According to a further preferred embodiment of the present invention, the information related to the configuration information content or the information requested by the request to provide configuration information corresponds to an eNodeB Configuration Update information, especially comprising information related to at least one out of the following:

the list of served radio cells to add (i.e. the complete list of added radio cells (served by the first base station entity), wherein the list of served radio cells to add preferably comprises—for each radio cell to add—a served radio cell information and/or a neighbor (radio cell) information, wherein the neighbor (radio cell) information preferably comprises an indication of the cell global identifier (ECGI, E-UTRAN Cell Global Identifier) of the neighbor radio cells to add and/or a physical cell identifier information of the neighbor radio cells to add and/or an indication of the radio frequency channel number (EARFCN and/or EARFCN Extension) of the neighbor radio cells to add and/or an indication of the tracking area codes of the neighbor radio cells to add, the list of served radio cells to modify (i.e. the complete list of modified radio cells served by the first base station entity), wherein the list of served radio cells to modify preferably comprises—for each radio cell to modify—an old served radio cell information (old ECGI, old E-UTRAN Cell Global Identifier of the radio cell to be modified) and/or a deactivation Indication (i.e. a complete list of deleted radio cells served by the eNodeB, i.e. the first base station entity) and/or a served radio cell information and/or a neighbor (radio cell) information, wherein the neighbor (radio cell) information preferably comprises an indication of the cell global identifier (ECGI, E-UTRAN Cell Global Identifier) of the neighbor radio cells to modify and/or a physical cell identifier information of the neighbor radio cells to modify and/or an indication of the radio frequency channel number of the neighbor radio cells to modify (EARFCN and/or EARFCN Extension) of the neighbor radio cells to modify and/or an indication of the tracking area codes of the neighbor radio cells to modify, the list of served radio cells to delete (i.e. the complete list of deleted radio cells served by the first base station entity), wherein the list of served radio cells to delete preferably comprises—for each radio cell to delete—an old served radio cell information (old ECGI, old E-UTRAN Cell Global Identifier of the radio cell to be deleted), the list or the identity of the group of specific network nodes to add, the list or the identity of the group of specific network nodes to delete.

Thereby, it is advantageously possible to transmit relevant information to the second base station entity for the most relevant cases or situations.

According to the present invention, it is furthermore preferred that the configuration information content corresponds to an eNodeB Configuration Update information.

Additionally, it is preferred according to the present invention that the first indirect communication interface is an S1 communication interface between the first base station entity and the specific network node, and wherein the second indirect communication interface is, likewise, an S1 communication interface between the second base station entity and the specific network node.

Thereby, it is advantageously possible to use the established S1 communication interface to transmit the information related to the configuration information.

Furthermore, it is preferred according to the present invention that the transmission of the first message—wherein the information related to the configuration information content is a configuration information—is triggered by a modification of the configuration of the first base station entity, especially, a modification of parameters of the first base station entity, wherein the parameters are preferably at least one out of the following:

the physical cell identifier, the radio frequency or radio frequencies used by the first base station entity, especially the absolute radio frequency channel number.

Thereby, it is advantageously possible to transmit these important pieces of information to the second base station entity.

Additionally, it is preferred according to the present invention that the transmission of the first message—wherein the information related to the configuration information content is a request to provide configuration information—is triggered either periodically or upon a detection in the mobility pattern observed by the first base station entity.

Thereby, it is advantageously possible that such changes in the configuration of the second base station entity are able to be transmitted to the first base station entity in a reliable manner.

Furthermore, the present invention relates to a mobile communication network improved communication between network nodes of the mobile communication network, wherein the mobile communication network comprises an access network and a core network, wherein the access network comprises a plurality of base station entities, the plurality of base station entities comprising at least a first base station entity, a second base station entity, wherein the first and second base station entities are enabled—using a first indirect communication interface between the first base station entity and a specific network node of the mobile communication network and using a second indirect communication interface between the second base station entity and the specific network node of the mobile communication network—to transmit an information related to a configuration information content from the first base station entity to the second base station entity but wherein the first and second base station entities are lacking a direct communication interface to directly transmit the configuration information from the first base station entity to the second base station entity, wherein the mobile communication network is configured such that:

a first message is transmitted, by the first base station entity and using the first indirect communication interface, to the specific network node, a second message is transmitted, by the specific network node and using the second indirect communication interface, to the second base station entity, wherein via the first and second messages, the information related to the configuration information content is transparently transmitted from the first base station entity to the second base station entity, via the specific network node of the mobile communication network, using the first and second indirect communication interface.

Additionally, the present invention relates to a mobile communication network improved communication between network nodes of the mobile communication network, wherein the mobile communication network comprises an access network and a core network, wherein the access network comprises a plurality of base station entities, the plurality of base station entities comprising at least a first base station entity, a second base station entity, wherein the first and second base station entities are enabled—using a first indirect communication interface between the first base station entity and a specific network node of the mobile communication network and using a second indirect communication interface between the second base station entity and the specific network node of the mobile communication network—to transmit an information related to a configuration information content from the first base station entity to the second base station entity, wherein a direct communication interface is able to be established between the first and second base station entities in order for the first and second base station entities to be able to communicated directly with each other but wherein the first and second base station entities are lacking the direct communication interface to directly transmit the configuration information from the first base station entity to the second base station entity, wherein the mobile communication network is configured such that:

a first message is transmitted, by the first base station entity and using the first indirect communication interface, to the specific network node, a second message is transmitted, by the specific network node and using the second indirect communication interface, to the second base station entity, wherein via the first and second messages, the information related to the configuration information content is transparently transmitted from the first base station entity to the second base station entity, via the specific network node of the mobile communication network, using the first and second indirect communication interface.

Additionally, the present invention relates to a program comprising a computer readable program code which, when executed on a computer and/or on a base station entity and/or on a network component of a mobile communication network or in part on a first base station entity and in part on a second base station entity, causes the computer and/or the base station entity and/or the first and second base station entities and/or the network component of the mobile communication network to perform exemplary embodiments of the inventive method.

Still additionally, the present invention relates to computer program product for improved communication between network nodes of a mobile communication network, the computer program product comprising a computer program stored on a storage medium, the computer program comprising program code which, when executed on a computer and/or on a base station entity and/or on a network component of a mobile communication network or in part on a first base station entity and in part on a second base station entity, causes the computer and/or the base station entity and/or the first and second base station entities and/or the network component of the mobile communication network to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network, is schematically shown. The mobile communication network 100 comprises an access network 110 and a core network 120. The core network 120 is only schematically shown by means of a cloud representation. The mobile communication network 100 is preferably a cellular telecommunications network comprising typically a plurality of network cells or radio cells, two of which are represented in FIG. 1 by means of a solid line and reference signs 11 (first network cell or radio cell) and 12 (second network cell or radio cell). In the telecommunications network 100, typically a plurality of user equipments are camping on the telecommunications network 100 within the network cells or radio cells 11, 12, i.e. the user equipments are connected or are camping on a first base station entity 111, the first base station entity 111 serving the first network cell or radio cell 11, or on a second base station entity 112, the second base station entity 112 serving the second network cell or radio cell 12. The first and second base station entities 111, 112 are typically base transceiver stations, e.g. an eNodeB in case of LTE.

According to the standard of LTE mobile communication networks, a direct communication interface 119 (especially the so-called X2 communication interface) is able to be established between the first and second base station entities 111, 112 in order for the first and second base station entities 111, 112 to be able to communicated directly with each other. According to the present invention, especially configuration information is able to be transmitted between the first and second base station entities 111, 112 without using the direct communication interface 119 between these base station entities, i.e. typically the direct communication interface 119 is not established between the first and second base station entities 111, 112.

Additionally and likewise according to the standard of LTE mobile communication networks, an indirect communication interface is able to be established between the first and second base station entities, this indirect communication interface being established by using a first indirect communication interface 128 between the first base station entity 111 and a specific network node 121 of the mobile communication network 100 and, furthermore, using a second indirect communication interface 129 between the second base station entity 112 and the specific network node 121 of the mobile communication network 100.

According to the present invention, an information related to a configuration information content is transmitted from the first base station entity 111 to the second base station entity 112 without the direct communication interface 119 being established between them, i.e. the first and second base station entities 111, 112 are lacking the direct communication interface 119 to directly transmit the information related to the configuration information.

Figure 2:
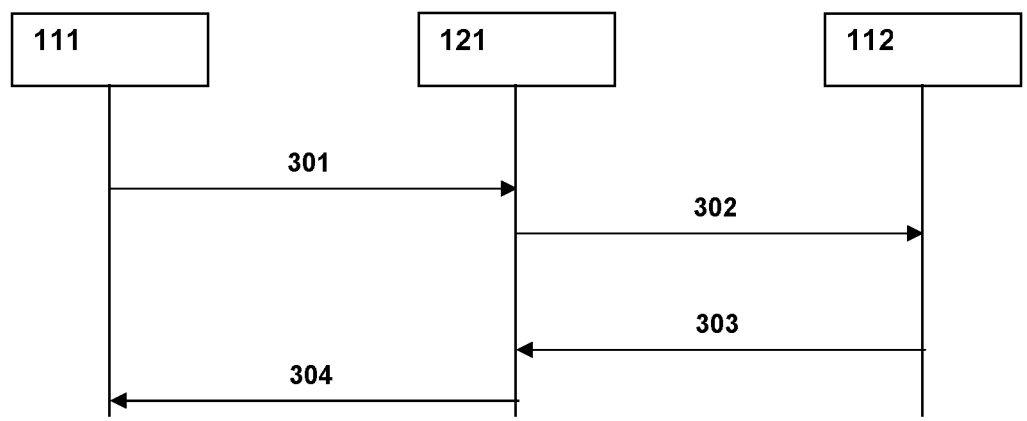
FIG. 2 schematically illustrates a communication diagram between the first and second base station entities in case of a transmission of information related to the configuration information content according to an exemplary embodiment of the present invention.

In FIG. 2, the communication diagram according to the present invention between the first and second base station entities in case of a transmission of information related to the configuration information content is schematically represented.

According to the present invention, in a first step, a first message 301 is transmitted, by the first base station entity 111 and using the first indirect communication interface 128, to the specific network node 121. In a second step, subsequent to the first step, a second message 302 is transmitted, by the specific network node 121 and using the second indirect communication interface 129, to the second base station entity 112.

By using the first and second messages 301, 302, the information related to the configuration information content—especially a configuration information relating to a change of the configuration of the first base station entity 111—is transparently transmitted from the first base station entity 111, via the indirect communication interfaces 128, 129, to the second base station entity 112. The first message 301 corresponds preferably to an "ENB CONFIGURATION UPDATE" message, being comprised in a "SON Configuration Transfer IE" message, and this message being in turn comprised in an "ENB CONFIGURATION TRANSFER" message. The second message 302 corresponds preferably to an "ENB CONFIGURATION UPDATE" message, being comprised in a "SON Configuration Transfer IE" message, and this message being in turn comprised in an "MME CONFIGURATION TRANSFER" message.

In order to reliably transmit the information related to the configuration information content, it is preferred according to the present invention that the first base station entity 111 is aware that the information related to the configuration information content is actually received at the second base station entity 112. Therefore, it is preferred that in a third step, subsequent to the second step, a third message 303 is transmitted, by the second base station entity 112 and using the second indirect communication interface 129, to the specific network node 121, and that, in a fourth step, subsequent to the third step, a fourth message 304 is transmitted, by the specific network node 121 and using the first indirect communication interface 128, to the first base station entity 111.

Via the third and fourth messages 303, 304, the reception, at the second base station entity 112, of the information related to the configuration information content is acknowledged (in the positive or non-failure case) to the first base station entity 111 or—in case that the information related to the configuration information content of the first and second messages 301, 302 comprises a request to provide configuration information—the configuration information content transmitted to the first base station entity 111. The third message 303 corresponds (in the non-failure case) preferably to an "ENB CONFIGURATION UPDATE ACKNOWLEDGE" message, being comprised in a "SON Configuration Transfer IE" message, and this message being in turn comprised in an "ENB CONFIGURATION TRANSFER" message. The fourth message 304 corresponds preferably to an "ENB CONFIGURATION UPDATE ACKNOWLEDGE" message, being comprised in a "SON Configuration Transfer IE" message, and this message being in turn comprised in an "MME CONFIGURATION TRANSFER" message. In case of a failure, the third message 303 corresponds preferably to an "ENB CONFIGURATION UPDATE FAILURE" message, being comprised in a "SON Configuration Transfer IE" message, and this message being in turn comprised in an "ENB CONFIGURATION TRANSFER" message. In this case, the fourth message 304 corresponds preferably to an "ENB CONFIGURATION UPDATE FAILURE" message, being comprised in a "SON Configuration Transfer IE" message, and this message being in turn comprised in an "MME CONFIGURATION TRANSFER" message.

According to the present invention, it is preferred that certain pieces of information, especially configuration information, are able to be transmitted using the indirect communication interfaces 128, 129 between the first and second base station entities 111, 112. Such pieces of information typically correspond to those that would be able to be transmitted via a direct communication interface 119 between the first and second base station entities 111, 112 (which is typically realized via an X2 communication interface) but which—according to the present invention—is supposed to be non-existent between the first and second base station entities 111, 112 (typically due to the fact that handover events are too infrequent between the first and second base station entities 111, 112, i.e. handover events towards or from other base station entities (not shown in FIG. 1) either to or from the first base station entity 111 and/or to or from the second base station entity 112 are more frequent such that a direct communication interface (i.e. an X2 communication interface) established between those other base station entities and the first and/or the second base station entities 111, 112 is prioritized compared to the establishment of a direct communication interface (i.e. an X2 communication interface) between the first and second base station entities 111, 112). Such information (typically corresponding to those that would be able to be transmitted via a direct communication interface 119 between the first and second base station entities 111, 112) include but are not limited to a complete list of the served radio cells of the first base station entity 111 and, if available, a list of supported globally unique group ids "GU Group Ids". Thereby, according to the present invention, the functionalities of the X2 communication interface are extended via the indirect communication interface 128, 129, i.e. via the S1 communication interface.

According to the present invention, a couple of additional pieces of information are beneficial to exchange via the indirect communication interface 128, 129 (or the S1 communication interface). Such pieces of information include but are not limited to:

A usage report respectively a generic value expressing the benefit of the remaining direct communication interfaces 119 (or X2 communication interfaces) connected to the sending base station entity (or eNodeB);

Statistics about the frequency of handovers or cell changes of user equipments between the first and second base station entities 111, 112;

Capabilities or properties of the target radio cell, especially comprising (but not being limited to):
an indication whether multi frequency band support is available or not,
an indication whether broadcast support is available,
an indication whether dual-connectivity support is available,
an indication whether support of a certain MIMO configuration is available,
an indication whether support of a certain carrier aggregation scenario is available.

These pieces of information allow the source base station entity (eNodeB) a more accurate decision whether to handover a user equipment and allow the first and second base station entities 111, 112 to more accurately maintain their interfaces, i.e. it allows the first and second base station entities 111, 112 to determine autonomously and more accurately which direct communication interfaces (X2 communication interfaces) should be subject to be removed or to be converted from a direct communication interface type (X2 communication interface type) handover relation to an indirect communication interface type (S1 communication interface type) handover relation.

According to the present invention, by applying such a procedure, the neighbor eNodeB (i.e. the second base station entity 112 from the perspective of the first base station entity 111) can be informed about parameters that usually are only available via an existing direct communication interface 119 (or an X2 communication interface), or via an (active or triggered by a centralized "top down" approach, i.e. not autonomously) configuration via at least one operations and maintenance center (and in reality via more than one operations and maintenance centers in case of base station entities (eNodeBs) from different vendors). This means that according to the present invention, the maintenance efforts of the telecommunications network in terms of correctly distributing or propagating the correct parameters and configurations to apply for the corresponding base station entities (especially in case of a multi-vendor operation of the telecommunications network, i.e. the base station entities are supplied by different vendors) can be reduced as a change of such parameters or configuration only needs to be communicated to the relevant base station entity, and the subsequent propagation of this change among the adjacent or neighboring base station entities (which are concerned by this change in view of mobility-related parameters (especially changes of the physical cell identifier and/or of the center or carrier frequency to apply) to apply) is able to be performed in an autonomous manner among these base station entities, independent of whether such base station entities are linked via a direct communication interface (X2 communication interface) or via an indirect communication interface (S1 communication interface).

According to the present invention, it is advantageously possible that such an exchange of information via the indirect communication interfaces 128, 129 uses the concept of transparent signaling via the specific network node 121, i.e. the intermediate network nodes (or specific network nodes 121), typically a network node of the core network 120, do not need to interpret the content of the messages (i.e. of the first and/or third messages 301, 303) sent via such a specific network node 121, typically the mobility management entity (MME).

In order to enable the above described advantages and beside the above mentioned information, within the first message 301 (especially an "ENB CONFIGURATION TRANSFER IE" message or an "ENB CONFIGURATION UPDATE IE" message) from the first base station entity 111 to the specific network node 121 (typically the MME corresponding to the first base station entity 111) and the second message 302 (especially an "MME CONFIGURATION TRANSFER IE" message or an "MME CONFIGURATION UPDATE IE" message) from the specific network node 121 (typically the same MME) to the second base station entity 112, an information content comprising at least part of the following (but not being limited to the following) pieces of information may be signaled:—the list of served radio cells to add (i.e. the complete list of added radio cells (served by the first base station entity 111), wherein the list of served radio cells to add preferably comprises—for each radio cell to add—a served radio cell information and/or a neighbor (radio cell) information, wherein the neighbor (radio cell) information preferably comprises an indication of the cell global identifier (ECGI, E-UTRAN Cell Global Identifier) of the neighbor radio cells to add and/or a physical cell identifier information of the neighbor radio cells to add and/or an indication of the radio frequency channel number (EARFCN and/or EARFCN Extension) of the neighbor radio cells to add and/or an indication of the tracking area codes of the neighbor radio cells to add, the list of served radio cells to modify (i.e. the complete list of modified radio cells served by the first base station entity 111), wherein the list of served radio cells to modify preferably comprises—for each radio cell to modify—an old served radio cell information (old ECGI, old E-UTRAN Cell Global Identifier of the radio cell to be modified) and/or a deactivation Indication (i.e. a complete list of deleted radio cells served by the eNodeB, i.e. the first base station entity 111) and/or a served radio cell information and/or a neighbor (radio cell) information, wherein the neighbor (radio cell) information preferably comprises an indication of the cell global identifier (ECGI, E-UTRAN Cell Global Identifier) of the neighbor radio cells to modify and/or a physical cell identifier information of the neighbor radio cells to modify and/or an indication of the radio frequency channel number of the neighbor radio cells to modify (EARFCN and/or EARFCN Extension) of the neighbor radio cells to modify and/or an indication of the tracking area codes of the neighbor radio cells to modify, the list of served radio cells to delete (i.e. the complete list of deleted radio cells served by the first base station entity 111), wherein the list of served radio cells to delete preferably comprises—for each radio cell to delete—an old served radio cell information (old ECGI, old E-UTRAN Cell Global Identifier of the radio cell to be deleted), the list or the identity of the group of specific network nodes 121 to add, the list or the identity of the group of specific network nodes 121 to delete.

Neighbor relations between base station entities (in the framework of the SON ANR functionality within the mobile communication network 100) are in general configured in a uni-directional manner from point of view of a single base station (e.g. from first base station as source towards a second base station as target). Typically, relations (between radio cells, i.e. between the first and second base station entities 111, 112) that are used more often do exist, in most cases, also in opposite direction (i.e. not only from the first base station entity 111 towards the second base station entity 112 but also from the second base station entity 112 towards the first base station entity 111) and from a more general perspective, these relations can be seen as symmetrical or bi-directional configured neighbor relations.

Within the context of information exchange and update, especially related to the configuration data (like carrier frequency or cell identifier), this fact has to be considered, especially if in addition no direct interface between the radio nodes exist, like an X2 communication interface. Hence according to the present invention, two operational modes are provided:

According to a first operational mode, or according to an active communication approach, it is assumed that a larger amount of S1 connected source and neighbored target radio cells (eNodeBs) also exist in the other direction (i.e. bi-directionally), which means that these relations are available as symmetrical relations; even if this information (i.e. whether a relation is symmetrical configured or not) is not known within the source eNodeB itself, according to the first operational mode according to the present invention all configured target base station entities are informed about performed parameter changes in the source radio cell (eNodeB); in case of an existing direct communication interface, such as an X2 communication interface, between the affected eNodeB, this will be done via this direct communication interface and via the already existing functionality and for purely indirectly (i.e. via an S1 communication interface) connected target radio cells according to the present invention. According to the first operational mode, the information related to a configuration information is (or comprises) a configuration information, i.e. the configuration information is transmitted (via the first and second messages 301, 302) from the first base station entity 111 indirectly (via the specific network node 121 transparently forwarding this message) to the second base station entity 112, and this transmission of configuration information is acknowledged via the third and fourth messages 303, 304 from the second base station entity 112 indirectly (via the specific network node 121 transparently forwarding this message) to the first base station entity 111.

A second operational mode, or a reactive communication approach, does not assume all neighbor relations to be configured in both directions and hence, at least in part, being only configured in a uni-directional (or non-symmetrical) manner; in these cases, (as the active communication mode described above does not work, because an eNodeB does not know where (in one or a plurality of the surrounding or neighboring eNodeBs) it is configured as target cell) the information related to a configuration information is (or comprises) a request to provide configuration information, i.e. via the first and second message 301, 302 no configuration information is transmitted (like according to the first operational mode) but a request to provide configuration information is transmitted (via the first and second messages 301, 302) from the first base station entity 111 indirectly (via the specific network node 121 transparently forwarding this message) to the second base station entity 112, and this transmission of a request to provide configuration information is answered via the third and fourth messages 303, 304 from the second base station entity 112 indirectly (via the specific network node 121 transparently forwarding this message) to the first base station entity 111, the third and fourth messages 303, 304 in this case comprising the requested configuration information. One manner of triggering the second operational mode includes, e.g., detecting a changed mobility pattern: In cases of a change of the cell identifier (e.g. PCI) and/or carrier frequency (DL-ARFCN) (of the second base station entity 112 as source base station entity), it can be assumed that no handover will successfully be executed (partly even not triggered) from a surrounded cell (i.e. from the first base station entity 111) towards the second base station entity 112 due to parameter mismatch after the performed parameter change (within the second base station entity 112) that the first base station entity 111 is not aware of; however, the first base station entity 111 is able to detect that no further handover events occur (towards the second base station entity 112 as target base station entity), and hence such a change in the mobility pattern from the first base station entity 111 towards the second base station entity 112 can be used to trigger a request of eNodeB Configuration data via S1 interface via the specific network node 121, especially an MME. The trigger to request such a "eNodeB Configuration Request" can also include other criteria such as: a periodic request or a general request in combination with an eNodeB reset/restart procedure.

To cover the second operational mode, a request/response procedure (via the first, second, third and fourth messages 301, 302, 303, 304) is implemented. To be more precise, in this use case, the parameter change, like PCI, occurs in the second base station entity 112. The first base station entity 111 is not configured as neighbor (target) in the second base station entity 112 (eNodeB 2 as source base station entity), and no direct communication interface (like an X2 communication interface) exists between the second base station entity 112 (eNodeB 2) and the first base station entity 111 (eNodeB 1). Within the first base station entity 111 (eNodeB 1), the second base station entity 112 (eNodeB 2) is configured as neighbor base station entity and in case that an event (such that a configured time interval, i.e. a time span x, is exceeded during which no handovers are triggered (from the first base station entity 111 to the second base station entity 112)) happens the request for configuration information according to the second operational mode is triggered.

Within this context, the response can include the list of eNodeB parameters (see table above) as requested as well as a failure message. Especially the failure message can be produced from the second base station entity 112 (eNodeB 2) as well as from the MME (i.e. the specific network node 121), e.g. if a timer expires and no response from the second base station entity 112 (eNodeB 2) to the MME is received.

The specific network node 121 (typically an MME) can also be a chain of different involved network nodes (e.g. a plurality of MMEs), e.g. due to the fact that the first base station entity 111 and the second base station entity 112 are connected to different specific network nodes 121 (or MMEs).

The described message flow according to the second operational mode can also be transmitted in containers such as SON Configuration Transfer Information Elements and eNB/MME Configuration Transfer, if needed according to the principle as disclosed above.

Depending on the implementation in the eNodeB, also a supervision timer might be implemented to initiate repetitions of the eNodeB configuration request if no response could be received from MME.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for communication between network nodes of a mobile communication network, wherein the method comprises:
    transmitting information related to configuration information from a first base station entity to a second base station entity via a specific network node of the mobile communication network, wherein the first and second base station entities support the capability to establish a direct communication interface between the first and second base station entities but the first and second base station entities do not have a direct communication interface between the first and second base station entities, wherein the transmitting further comprises:
        transmitting, by the first base station, a first message to the specific network node of the mobile communication network using a first indirect communication interface between the first base station entity and the specific network node; and
        transmitting, by the specific network node, a second message to the second base station entity using a second indirect communication interface between the second base station entity and the specific network node;
    wherein the first and second base station entities using the first and second indirect communication interfaces instead of establishing a direct communication interface between the first and second base station entities is due to:
        one or more direct communication interfaces between the first base station entity and one or more other base stations being prioritized over a direct communication interface between the first and second base station entities; and/or
        one or more direct communication interfaces between the second base station entity and one or more other base stations being prioritized over a direct communication interface between the first and second base station entities; and
    wherein prioritization for a direct communication interface between two respective base station entities is based on frequency of handover events between the two respective base station entities, with lower frequency corresponding to lower prioritization;
    wherein the method further comprises:
        sending, by the first base station to the second base station via the first and second indirect communication interfaces, a first usage report comprising information regarding remaining direct communication interfaces connected to the first base station; and/or
        sending, by the second base station to the first base station via the first and second indirect communication interfaces, a second usage report comprising information regarding remaining direct communication interfaces connected to the second base station.

2. The method according to claim 1, wherein the information related to the configuration information comprises the configuration information.

3. The method according to claim 1, wherein the information related to the configuration information comprises a request to provide the configuration information.

4. The method according to claim 1, further comprising:
    receiving, by the first base station entity, a response from the second base station entity via the specific network node of the mobile communication network.

5. The method according to claim 1, wherein the specific network node is a mobility management entity (MME) within a core network of the mobile communication network.

6. The method according to claim 1, wherein the information related to the configuration information corresponds to eNodeB Configuration Update information.

7. The method according to claim 6, wherein the eNodeB Configuration Update information comprises:
    a list of served radio cells to add;
    a list of served radio cells to modify;
    a list of served radio cells to delete;
    a list or an identity of a group of specific network nodes to add; and/or
    a list or an identity of a group of specific network nodes to delete.

8. The method according to claim 1, wherein the first indirect communication interface is an S1 communication interface between the first base station entity and the specific network node, and wherein the second indirect communication interface is an S1 communication interface between the second base station entity and the specific network node.

9. The method according to claim 1, wherein the transmission of the first message is triggered by a modification of the configuration of the first base station entity, wherein the modification of the configuration of the first base station entity comprises a modification of at least one of the following parameters:
   a physical cell identifier; or
   a radio frequency or radio frequencies used by the first base station entity.

10. The method according to claim 1, wherein the transmission of the first message is triggered either periodically or based on a mobility pattern observed by the first base station entity.

11. A mobile communication network for communication between network nodes of the mobile communication network, wherein the mobile communication network comprises:
   an access network;
   a core network; and
   a specific network node;
   wherein the access network comprises a plurality of base station entities, the plurality of base station entities comprising a first base station entity and a second base station entity;
   wherein the first and second base station entities and the specific network node are configured using a first indirect communication interface between the first base station entity and the specific network node of the mobile communication network and using a second indirect communication interface between the second base station entity and the specific network node of the mobile communication network to transmit information related to configuration information from the first base station entity to the second base station entity;
   wherein the first and second base station entities support the capability to establish a direct communication interface between the first and second base station entities but the first and second base station entities do not have a direct communication interface between the first and second base station entities;
   wherein transmitting the information related to configuration information from the first base station entity to the second base station entity further comprises:
   transmitting, by the first base station, a first message to the specific network node of the mobile communication network using a first indirect communication interface between the first base station entity and the specific network node; and
   transmitting, by the specific network node, a second message to the second base station entity using a second indirect communication interface between the second base station entity and the specific network node;
   wherein the first and second base station entities using the first and second indirect communication interfaces instead of establishing a direct communication interface between the first and second base station entities is due to:
   one or more direct communication interfaces between the first base station entity and one or more other base stations being prioritized over a direct communication interface between the first and second base station entities; and/or
   one or more direct communication interfaces between the second base station entity and one or more other base stations being prioritized over a direct communication interface between the first and second base station entities; and
   wherein prioritization for a direct communication interface between two respective base station entities is based on frequency of handover events between the two respective base station entities, with lower frequency corresponding to lower prioritization,
   wherein:
   the first base station is further configured to send, to the second base station via the first and second indirect communication interfaces, a first usage report comprising information regarding remaining direct communication interfaces connected to the first base station; and/or
   the second base station is further configured to send, to the first base station via the first and second indirect communication interfaces, a second usage report comprising information regarding remaining direct communication interfaces connected to the second base station.

12. One or more non-transitory computer readable mediums having processor-executable instructions stored thereon for communication between network nodes of a mobile communication network, wherein the processor-executable instructions, when executed, facilitate performance of the following:
   transmitting information related to configuration information from a first base station entity to a second base station entity via a specific network node of the mobile communication network, wherein the first and second base station entities support the capability to establish a direct communication interface between the first and second base station entities but the first and second base station entities do not have a direct communication interface between the first and second base station entities, wherein the transmitting further comprises:
   transmitting, by the first base station, a first message to the specific network node of the mobile communication network using a first indirect communication interface between the first base station entity and the specific network node; and
   transmitting, by the specific network node, a second message to the second base station entity using a second indirect communication interface between the second base station entity and the specific network node;
   wherein the first and second base station entities using the first and second indirect communication interfaces instead of establishing a direct communication interface between the first and second base station entities is due to:
   one or more direct communication interfaces between the first base station entity and one or more other base stations being prioritized over a direct communication interface between the first and second base station entities; and/or
   one or more direct communication interfaces between the second base station entity and one or more other base stations being prioritized over a direct communication interface between the first and second base station entities; and
   wherein prioritization for a direct communication interface between two respective base station entities is based on frequency of handover events between the two respective base station entities, with lower frequency corresponding to lower prioritization, wherein the processor-executable instructions, when executed, further facilitate performance of the following:
- sending, by the first base station to the second base station via the first and second indirect communication interfaces, a first usage report comprising information regarding remaining direct communication interfaces connected to the first base station; and/or
- sending, by the second base station to the first base station via the first and second indirect communication interfaces, a second usage report comprising information regarding remaining direct communication interfaces connected to the second base station.

13. The method according to claim 1, wherein the first usage report expresses a benefit of the remaining direct communication interfaces connected to the first base station, and the second usage report expresses a benefit of the remaining direct communication interfaces connected to the second base station.

* * * * *